(No Model.)
D. R. McLENNAN.
TWO WHEELED VEHICLE.
No. 261,372. Patented July 18, 1882.
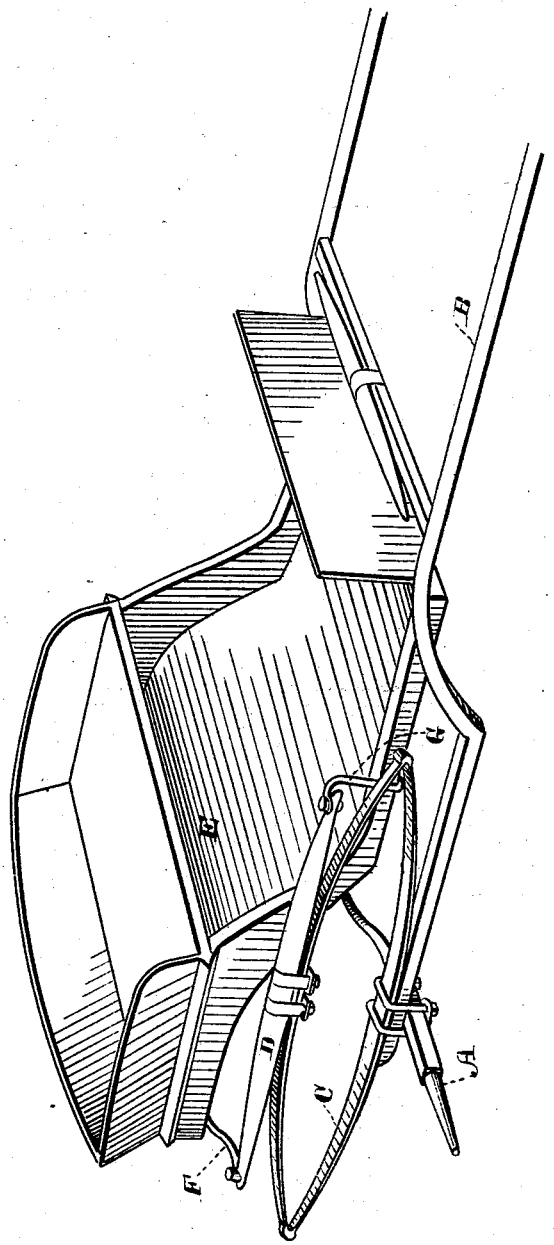
Witnesses,
Geo H Strong
[signature]
Inventor
D. R. McLennan
By Dewey & Co
Attorneys

United States Patent Office.

DANIEL R. McLENNAN, OF ST. HELENA, CALIFORNIA.

TWO-WHEELED VEHICLE.

SPECIFICATION forming part of Letters Patent No. 261,372, dated July 18, 1882.

Application filed May 27, 1882. (No model.)

*To all whom it may concern:*

Be it known that I, DANIEL R. McLENNAN, of St. Helena, county of Napa, State of California, have invented an Improved Two-Wheel Vehicle; and I hereby declare the following to be a full, clear, and exact description thereof.

My invention relates to the class of two-wheel vehicles; and it consists in placing ordinary elliptical springs upon the sides of the vehicle, in securing side supporting-bars upon said springs, and in sustaining the body upon transverse body-loops extending between the ends of the supporting-bars, all of which will hereinafter fully appear.

The object of my invention is to provide an easy-riding vehicle in which the jogging motion of the horse will not unpleasantly affect the seat, and which will be simple and economical in construction.

Referring to the accompanying drawing, the figure is a perspective view.

Let A represent the axle of the vehicle.

B are the shafts, clipped to the axle, and curved upward, as shown, for convenience in entering the vehicle.

C are the springs. These are the ordinary elliptical springs, clipped to the shafts and axle; but instead of being in front and behind, as is the usual construction, they are upon the sides and lie parallel with the shafts. Upon top of the springs and parallel therewith are side bars, D, clipped at their middle to the springs.

E is the body of the vehicle. Its rear portion rests upon and is secured to a body loop or strap, F, passing across under the body and having its ends bolted to the rear ends of the side bars. Its forward portion lies between the shafts, but independently of them, and is similarly secured to a body loop or strap, G, passing under it and having its ends secured to the forward ends of the side bars. The rear of the body being high, the strap F rises to it, and the front or foot rest being low, the strap G is bent down, as shown. The effect of this construction is as follows: In carts in which the shafts and springs are firmly clipped to the axle and the seat is rigidly secured to the tops of the springs the jogging motion of the horse causes the axle to turn slightly, and the body is thus given an unpleasant rocking movement. Various means have been tried to overcome this difficulty, all having in view such construction as to allow a certain degree of independence to the seat, whereby the unpleasant motion might be counteracted. This I accomplish in a novel and simple manner. The body has full support in front and behind, and by reason of those supports being at points widely separated over the length of the springs their full effect can be obtained. Thus when the shafts are raised and the greater weight of the rider is instinctively thrown forward upon the front body-loop the springs give in front, allowing the body sufficient independent motion to produce the effect. The same is true of the rear portion. The body is not affected by the rocking motion of the springs derived from the axle, as it would be if it were secured to a cross-bar between the top centers of the springs. The construction, in addition to effecting the result, is simple and the vehicle may be made at little cost.

Having thus described my invention, what I claim as new, and desire to secure by Letters Patent, is—

In a two-wheel vehicle, the axle A, shafts B, clipped to the axle, side springs, C, clipped to the shafts and axle and lying parallel with the shafts, side bars, D, clipped to the tops of the springs and extending parallel with them, the body E, independent of the shafts, and the front and rear body loops or straps, G and F, bolted to the forward and rear ends, respectively, of the side bars, D, and extending under and across the body to support it, substantially as and for the purpose herein described.

In witness whereof I hereunto set my hand.

DANIEL R. McLENNAN.

Witnesses:
H. E. ALDEN,
W. A. BRUCE.